United States Patent [19]

Kato et al.

[11] Patent Number: 4,699,964

[45] Date of Patent: Oct. 13, 1987

[54] ANTISTATIC ACRYLIC RESIN COMPOSITION AND METHOD FOR THE PRODUCTION THEREOF

[75] Inventors: Yasuyuki Kato; Masahiro Yuyama; Masahiko Moritani; Mikio Futagami, all of Niihama, Japan

[73] Assignee: Sumitomo Chemical Company, Limited, Osaka, Japan

[21] Appl. No.: 860,480

[22] Filed: May 7, 1986

Related U.S. Application Data

[62] Division of Ser. No. 591,853, Mar. 21, 1984, Pat. No. 4,604,414.

[30] Foreign Application Priority Data

| Mar. 31, 1983 | [JP] | Japan | 58-57636 |
| Mar. 31, 1983 | [JP] | Japan | 58-57637 |
| Mar. 31, 1983 | [JP] | Japan | 58-57638 |
| Mar. 31, 1983 | [JP] | Japan | 58-57639 |
| Mar. 31, 1983 | [JP] | Japan | 58-57640 |

[51] Int. Cl.$^4$ ................................. C08F 2/00
[52] U.S. Cl. ................. 526/193; 524/710; 524/755; 524/761; 526/209; 526/240; 526/287
[58] Field of Search ............ 526/209, 240, 287, 193; 524/710, 755, 761

[56] References Cited

U.S. PATENT DOCUMENTS 3,219,608  11/1965  Ingleby et al. ............... 526/287

FOREIGN PATENT DOCUMENTS 0021023  10/1971  Japan .
0109944  10/1975  Japan .
0112944  10/1978  Japan .
0139516  10/1981  Japan .

*Primary Examiner*—Joseph L. Schofer
*Assistant Examiner*—J. M. Reddick
*Attorney, Agent, or Firm*—Birch, Stewart, Kolasch & Birch

[57] ABSTRACT

An acrylic resin composition having excellent permanent antistatic properties, which comprises a copolymer of an acrylic monomer comprising predominantly methyl methacrylate with a specific sulfonate and optionally a specific alkylene oxide and/or acidic phosphate, and a method for the production thereof. The acrylic resin composition of the invention shows excellent antistatic properties without losing the excellent properties of methacrylic resin, such as excellent transparency, mechanical properties, heat resistance, etc., and is useful for various utilities, such as preparation of advertising display, lighting fixtures, covers, nameplate, and various decoratings.

13 Claims, No Drawings

ANTISTATIC ACRYLIC RESIN COMPOSITION AND METHOD FOR THE PRODUCTION THEREOF

This application is a divisional of copending application Ser. No. 591,853, filed on Mar. 21, 1984 now U.S. Pat. No. 4,604,414.

The present invention relates to an acrylic resin composition having excellent permanent antistatic properties and a method for the production thereof.

Acrylic resins have excellent gloss, transparency weatherability, excellent mechanical properties, and processability, and hence, are widely used for the preparation of advertising displays, lighting fixtures, covers, nameplates, and various decorations. However, because of their static properties, the acrylic resin products are easily charged by rubbing, etc. and the surface thereof is adhered with dust or rubbish, which results in deterioration of the beautiful appearance and in warping of the pointer of an instrument panel.

There have been proposed various methods for imparting antistatic properties to the chargeable acrylic resin products. Such methods are roughly classified as follows:

1. A method of adding surfactants or fatty acid esters of a polyvalent alcohol to the acrylic resin.
2. A method of coating a silicon compound etc. onto the surface of the acrylic resin formed products.
3. A method of chemically modifying the resin structure by polymerizing the resin with a monomer having a hydrophilic group.

As the first method wherein a surfactant etc. is added thereto, there are proposed a method of using higher fatty acid monoglycerides (cf. Japanese Patent Publication (unexamined) No. 112949/1978), and a method of adding an alkyldiethanolamine derivative (cf. Japanese Patent Publication No. 21023/1978). According to this method, however, the surfactants etc. do not chemically bind to the acrylic resins, and hence, when the products are washed with water or rubbed, the products easily lose their antistatic properties. Besides, when a large amount of surfactants etc. are added thereto, the mechanical properties of the resin are deteriorated, and further, the surfactants etc. are easily bled to the surface thereof, by which the surface becomes sticky. Accordingly, the products are more easily adhered with dust or rubbish, which results in deterioration of the appearance.

It is disclosed in Japanese Patent Publication (unexamined) No. 109944/1975 that a sulfonyl group-containing compound, a polyoxyalkylene glycol and a phosphite compound are admixed to the acrylic resin in order to impart antistatic properties thereto. However, only benzenesulfonic acid and toluenesulfonic acid are exemplified as the sulfonyl group-containing compound in this disclosures, and such sulfonic acids do not chemically bind to the acrylic resin and further show inferior compatibility with the acrylic resin. Hence, this method deteriorates the peculiar characteristics of the acrylic resin, i.e. surface gloss and transparency.

As the second method wherein a silicon compound is coated on the surface of the product, there is proposed, for example, a method of coating a solution of a partial hydrolysate of ethyl silicate onto the surface of the product (cf. Japanese Patent Publication No. 6533/1956). This surface coating method is effective for obtaining excellent antistatic properties which are durable, and thus, this method is practically used in some utilities. However, this method requires the steps coating of the antistatic agent onto the products and drying thereof, and therefore, this method has a problem in its cost. This method also has drawbacks in that the coating film is easily broken by impact or rubbing to lose the antistatic properties.

As the third method wherein the structure of the resin per se is chemically modified, there is proposed, for example, a method of copolymerizing an acrylic monomer with a polyalkylene glycol monomethacrylate in order to improve the antistatic properties (cf. Japanese Patent Publication (unexamined) No. 139516/1981). According to this method, a nonionic monomer is chemically bound to the resin, and hence, the undesirable dissolving out of the monomer is prevented, but the effect is not significant. Moreover, when a large amount of the nonionic monomer is incorporated, the resin exhibits reduced mechanical properties and lower heat resistance and the characteristics of the acrylic resin are significantly deteriorated. There is no method which can be employed practically.

Among the sulfonate-containing monomers which are known to exhibit antistatic properties, monomers which are hardly dissolved in methyl methacrylate, for example, sodium allylsulfonate, sodium methallylsulfonate, sodium vinylsulfonate, sodium alkenyl-aromatic sulfonate, or sodium methacryloxyalkylsulfonate, are not effectively used for the acrylic resin, because of their low compatibility with the resin, which causes a significant decrease in the characteristics of the acrylic resin, such as transparency, surface gloss, and as such, the products cannot practically be used.

Under these circumstances, the present inventors have carried out extensive studies on an improved acrylic resin composition which has excellent permanent antistatic properties without deteriorating the peculiar apparence of the acrylic resin. As a result, it has been found that a copolymer of an acrylic monomer and a small amount of a specific sulfonate has the desired properties, that an alkylene oxide compound and/or an acidic phosphate are additionally incorporated in order to give more enhanced properties, and further that the desired composition can be prepared by copolymerizing an acrylic monomer or a partial polymerizate thereof with a sulfonate, optionally in the presence of an alkylene oxide compound and/or an acidic phosphate.

Accordingly, an object of the present invention is to provide an acrylic resin composition having excellent permanent antistatic properties. Another object of the present invention is to provide an improvement in antistatic properties of an acrylic resin without deteriorating the peculiar characteristics of the acrylic resin, such as excellent appearance, surface gloss, mechanical properties, etc. A further object of the present invention is to provide a method for the production of the antistatic acrylic resin composition. These and other objects and advantages of the present invention will be apparent to persons skilled in the art from the following description.

The antistatic acrylic resin composition of the present invention comprises a copolymer of 100 parts by weight of an acrylic monomer comprising predominantly methyl methacrylate with 0.5 to 15 parts by weight of a sulfonate (A) of the formula:

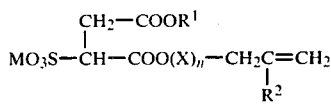

or

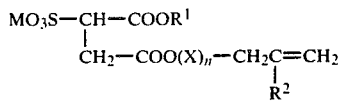

wherein $R^1$ is a hydrocarbon group having 1 to 18 carbon atoms, a substituted hydrocarbon group having 1 to 18 carbon atoms in the hydrocarbon moiety, or an alkylene oxide-containing group of which each alkylene oxide having 2 to 4 carbon atoms; $R^2$ is hydrogen atom or methyl group; X is an alkylene oxide having 2 to 4 carbon atoms; n is an integer of 0 to 35 in number average; M is an alkali metal, ammonium, an organic amine base, or an organic quaternary ammonium base.

0 to 15 parts by weight of an alkylene oxide (B) of the formula:

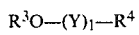

wherein $R^3$ is a hydrogen atom, a hydrocarbon group having 1 to 18 carbon atoms (e.g. an alkyl group having 1 to 18 carbon atoms, an aryl group having 6 to 18 carbon atoms, an aralkyl group having 7 to 18 carbon atoms), acryloyl group, or methacryloyl group; $R^4$ is a hydrogen atom, an alkyl group having 1 to 18 carbon atoms, an allyl group, an aryl group having 6 to 18 carbon atoms, or an aralkyl group having 7 to 18 carbon atoms; Y is an alkylene oxide having 2 to 4 carbon atoms; and l is 1 to 35 in number average, and 0 to 5 parts by weight of an acidic phosphate (C) of the formula:

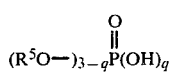

wherein $R^5$ is an alkyl group having 1 to 18 carbon atoms, an allyl group, an aryl group having 6 to 18 carbon atoms, an aralkyl group having 7 to 18 carbon atoms, an acryloxyalkyl group having 1 to 18 carbon atoms in the alkyl moiety, a methacryloxyalkyl group having 1 to 18 carbon atoms in the alkyl moiety, or a derivative thereof; q is 1 or 2.

The antistatic acrylic resin composition is produced by polymerizing 100 parts by weight of methyl methacrylate, a monomer comprising predominantly methyl methacrylate or a partial polymerizate thereof with 0.5 to 15 parts by weight of a sulfonate (A) of the formula:

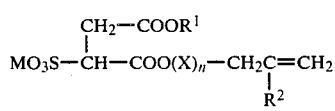

or

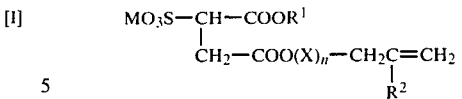

wherein $R^1$, $R^2$, X, M and n are as defined above, in the presence of 0 to 15 parts by weight of an alkylene oxide (B) of the formula:

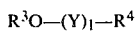

wherein $R^3$, $R^4$, Y and l are as defined above, and/or 0 to 5 parts by weight of an acidic phosphate (C) of the formula:

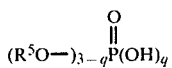

wherein $R^5$ and q are as defined above.

The starting monomer comprising predominantly methyl methacrylate used in the present invention includes methyl methacrylate alone and a monomer mixture comprising 50% by weight or more, preferably 70% by weight or more, of methyl methacrylate and a copolymerizable vinyl monomer. The copolymerizable vinyl monomer includes, for example, methacrylates such as ethyl methacrylate, propyl methacrylate, butyl methacrylate; acrylates such as methyl acrylate, ethyl acrylate, propyl acrylate, butyl acrylate, 2-ethylhexyl acrylate; unsaturated carboxylic acids such as acrylic acid, methacrylic acid, maleic acid, itaconic acid; acid anhydrides such as maleic anhydride, itaconic anhydride; hydroxy group-containing monomers such as 2-hydroxyethyl acrylate, 2-hydroxypropyl acrylate, tetrahydrofurfuryl acrylate, glycerol monoacrylate, 2-hydroxyethyl methacrylate, 2-hydroxypropyl methacrylate, tetrahydrofurfuryl methacrylate, glycerol monomethacrylate; nitrogencontaining monomers such as acrylamide, methacrylamide, acrylonitrile, methacrylonitrile, diacetone acrylamide, dimethylaminoethyl methacylate; epoxy group-containing monomers such as allyl glycidyl ether, glycidyl acrylate, glycidyl methacrylate; styrenic monomers such as styrene, α-methylstyrene; and crosslinking agents such as ethylene glycol diacrylate, allyl acrylate, ethylene glycol dimethacrylate, allyl methacrylate, divinylbenzene, trimethylolpropane triacrylate, or the like. Suitable, amounts and kinds of the copolymerizable monomers are selected in accordance with the desired properties of the objective antistatic resin products.

The composition of the present invention may optionally be incorporated with other additives such as heat stabilizing agents, ultraviolet absorbers, colorants, plasticizers and various fillers, unless undesirable effects occur.

In the formulae [I] and [II] as the sulfonte (A), $R^1$ denotes hydrocarbon groups, such as an alkyl group having 1 to 18 carbon atoms (e.g. methyl, ethyl, propyl, isopropyl, butyl, tert.-butyl, pentyl, hexyl, octyl, decyl, lauryl, tridecyl, stearyl), an alkenyl group having 2 to 18 carbon atoms (e.g. allyl, methallyl, oleyl); a cycloalkyl group having 4 to 18 carbon atoms (e.g. cyclopentyl, cyclohexyl, tert-butylcyclohexyl, nonylcyclohexyl), an aryl or alkylaryl group having 6 to 18 carbon atoms (e.g. phenyl, tolyl, furyl, pentylphenyl, nonylphenyl), and an aralkyl group having 7 to 18 carbon atoms (e.g.

benzyl, phenethyl, cymyl); a hydrocarbon group as set forth above, which is substituted with a member selected from the group consisting of hydroxy, a halogen (e.g. fluorine, chlorine, bromine, iodine), carboxyl, tetrahydrofurfuryl, epoxy, nitrile, amide, and amino groups; and an alkylene oxide-containing group wherein each alkylene oxide group having 2 to 4 carbon atoms which is prepared by adding an alkylene oxide to an active hydrogen-containing compound such as an alcohol, a phenol, a carboxylic acid or an amine.

$R^1$ is preferably a group of the formula: $-(X)_m-R$ wherein R is a hydrocarbon group having 1 to 18 carbon atoms as set forth above; X is an alkylene oxide group having 2 to 4 carbon atoms; and m is 0 to 35 in number average. Thus, the preferred sulfonate (A) is a compound of the formula:

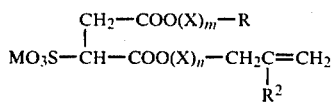   [I']

or

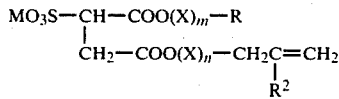   [II']

wherein R, $R^2$, X, M, m and n are as defined above.

Suitable examples of the sulfonate (A) are, for example, sodium allyl-alkyl-sulfosuccinate, potassium allyl-alkyl-sulfosuccinate, sodium methallyl-alkyl-sulfosuccinate, potassium methallyl-alkyl-sulfosuccinate, and compounds of the following formulae:

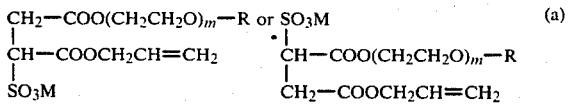   (a)

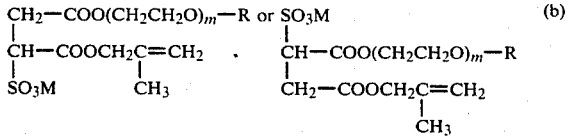   (b)

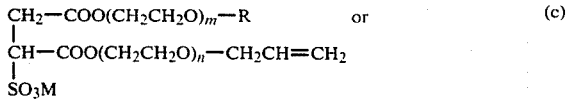   (c)

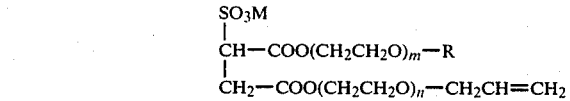

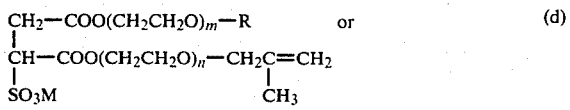   (d)

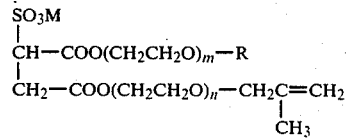

wherein R, M, m and n are as defined above, preferably the R group is a hydrocarbon group having 1 to 18 carbon atoms, m and n are in the range of 3 to 23 in number average, and M is an alkali metal.

The sulfonates (A) are incorporated in an amount of 0.5 to 15 parts by weight, preferably 1 to 10 parts by weight, to 100 parts by weight of the acrylic monomer comprising predominantly methyl methacrylate.

When the amount of the sulfonates (A) is less than 0.5 parts by weight, the desired permanent antistatic properties are not exhibited, and on the other hand, when the amount is over 15 parts by weight, the resin shows undesirable lower mechanical strength and lower water resistance and hence is not practically usable.

The sulfonates (A) of the formulae (I) and (II) used in the present invention are prepared by reacting a compound of the formula:

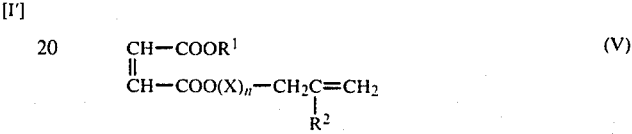   (V)

wherein $R^1$, $R^2$, X and n are as defined above, with an acid sulfite, metasulfite or sulfite or a mixture of these sulfites in the presence of water and/or an organic solvent. Suitable examples of these sulfites are acid sodium sulfite, acid potassium sulfite, acid ammonium sulfite, sodium metabisulfite, potassium metabisulfite, sodium sulfite, and ammonium sulfite, which are used alone or in a mixture thereof. There are also used organic amine sulfites and organic quaternary ammonium sulfites which are prepared by reacting an organic amine or an organic quaternary ammonium compound with sulfurous acid gas.

However, when the sulfonate (A) of the formula (I) or (II) in the form of a solution in water and/or an organic solvent is subjected to casting-polymerization in the presence of methyl methacrylate alone or a monomer comprising predominantly methyl methacrylate or a partial polymerizate thereof (syrup), the obtained methacrylic resin cast plate has an inferior appearance, i.e. has bubbles due to the water and/or organic solvent, which has less commercial value, and further, the cast plate shows inferior mechanical properties. Thus, these sulfonates cannot be used in the form of a solution in water and/or organic solvent, and hence, the water and/or organic solvent must be removed.

The reaction of the compound of the formula (V) and a sulfite is usually carried out in a solvent such as water and/or an organic solvent. Suitable examples of the organic solvent are alcohols (e.g. methyl alcohol, ethyl alcohol, isopropyl alcohol), ketones (e.g. acetone, methyl ethyl ketone), ethers (e.g. dioxane, ethylene glycol dimethyl ether), esters (e.g. ethyl acetate), dimethylformamide, dimethylsulfoxide, or the like. Since these organic solvents must be removed from the solution of the sulfonate (I) or (II) to give a solid sulfonate, they have preferably a low boiling point so as to have easy removability.

In view of the disadvantages as mentioned above, the solvent must be removed from the solution of the sulfonate (I) or (II) in water and/or organic solvent, and in this case, it is preferable to decrease the content of water and/or organic solvent to less than 5% by weight based on the weight of the sulfonate (I) or (II) (in solid). When the content of water and/or organic solvent is more than 5% by weight, an undesirable bubbled cast plate is obtained.

When the water and/or organic solvent is removed from the solution of sulfonate (I) or (II) to less than 5% by weight, there is obtained a sulfonate (I) or (II) in the form of a white or pale yellow solid, semisolid or sticky syrup. The appearance varies depending on the $R^1$ group and also on the kinds and content of the alkylene oxide chain. During the removal of water and/or organic solvent, the solution of sulfonate (I) or (II) becomes gradually viscous to result in difficulty in removing water and/or organic solvent. In order to make easier the removal of the solvent, it is preferable to heat the solution of sulfonate (I) or (II). However, when the solution is heated too much, the obtained solid sulfonate unexpectedly gives a methcarylic resin cast plate losing its beautiful gloss. It has surprisingly, been found that when the removal of water and/or organic solvent is carried out at a temperature of not higher than 130° C., the obtained solid sulfonate can yields an excellent methacrylic resin cast plate having beautiful gloss and appearance. When the removal of water and/or organic solvent is done at higher than 130° C., the sulfonate is excessively heated and denatured, and hence, the solid sulfonate thus obtained gives an undesirable methacrylic resin cast plate having less gloss.

It has also been found that the removal of water and/or organic solvent from the solution of sulfonate (I) or (II) is preferably carried out in the presence of a polymerization inhibitor and/or an antioxidant, by which the methacrylic resin cast plate can further maintain its beautiful gloss.

The polymerization inhibitor and antioxidant are not restricted but include all conventional polymerization inhibitors and antioxidants which are usually used for vinyl compounds. Suitable examples of the polymerization inhibitor are quinones (e.g. quinone, hydroquinone, hydroquinone monomethyl ether), piperidine derivatives (e.g. 4-benzoyloxy-2,2,6,6-tetramethylpiperidine), aromatic amines (e.g. diphenylamine, α-naphthylamine). Suitable examples of antioxidant are phenolic the antioxidants, such as monophenol compounds [e.g. 2,4-dimethyl-6-t-butylphenol, 4-methyl-2,6-di-t-butylphenol etc.], diphenol compounds [e.g. 4,4'-butylidenebis(3-methyl-6-t-butylphenol), 2,2'-methylenebis(4-methyl-6-t-butylphenol) etc.], triphenol compounds [e.g. 1,1,3-tris(2-methyl-5-butyl-4-hydroxyphenol)butane, 1,3,5-trimethyl-2,4,6-tris(3,5-di-t-butyl-4-hydroxybenzyl)benzene etc.], and tetraphenol compounds [e.g. tetra[methylene-3-(3,5-di-t-butyl-4-hydroxyphenyl)propionate]methane, bis[3,3-bis(4'-hydroxy-3'-t-butylphenyl)butanoic acid]glycol ester etc.]. These polymerization inhibitors and antioxidants are used alone or in combination thereof. They are used in an amount of 0.0005 to 0.5% by weight, preferably 0.001 to 0.1% by weight, based on the weight of the sulfonate (I) or (II) (in solid). When the amount of polymerization inhibitor and/or antioxidant is lower than 0.0005% by weight, they are not effective for maintaining the beautiful appearance of the obtained methacrylic resin cast plate, but on the other hand, when the amount is larger than 0.5% by weight, they produce a bad effect on the polymerization of methyl methacrylate.

In the present invention, 100 parts by weight of methyl methacrylate alone, or a monomer comprising predominantly methyl methacrylate, or a partial polymer thereof (syrup) is polymerized in the presence of 0.5 to 15 parts by weight, preferably 1 to 10 parts by weight, of the sulfonate (A), and the methacrylic resin thus obtained can produce an excellent methacrylic resin cast plate having excellent antistatic properties and also beautiful appearance (i.e. beautiful surface gloss). When the sulfonate is used in an amount of less than 0.5 part by weight per 100 parts by weight of the methacrylic monomer, the cast plate obtained has insufficient antistatic properties, and on the other hand, when the amount of the sulfonate is over 15 parts by weight, the product has inferior mechanical properties and occasionally shows less antistatic properties.

It has also been found that when an oxyalkylene group-containing sulfonate of the formula (I') or (II') wherein m is 3 to 23 in number average or a sulfonate of the formula (I) or (II) wherein n is 3 to 23 in number average is used, there can be obtained a methacrylic resin cast plate having excellent transparency.

Among the alkylene oxide compounds (B) of the formula (III), preferred compounds are a compound of the formula (III) wherein Y is an ethylene oxide group and l is 1 to 23, such as ethylene oxide addition compounds alone, or random copolymer of ethylene oxide and an alkylene oxide having 3 to 4 carbon atoms (e.g. propylene oxide or tetrahydrofuran) wherein more than half of the chains are ethylene oxide groups. Suitable examples of such alkylene oxide compounds (B) are diethylene glycol, triethylene glycol, polyethylene glycol, polyethylene glycol monoacrylate, polyethylene glycol monomethacrylate, ethylcellosolve acrylate, ethylcellosolve methacrylate, butylcellosolve methacrylate, methoxy-polyethylene glycol monoacrylate, methoxy-polyethylene glycol monomethacrylate, butoxypolyethylene glycol monomethacrylate, or the like.

When the alkylene oxide compound (B) of the formula (III) has an addition molar number of the alkylene oxide group of more than 35, it is solid and hardly dissolves in methyl methacrylate alone and further has poor compatibility with the sulfonate (A), and hence, the obtained methacrylic resin has unfavorably poor transparency. The alkylene oxide chain: $(Y)_l$ in the formula (III) has preferably a molecular weight of 150 to 1500, more preferably 150 to 1000.

The alkylene oxide compound (B) is used in an amount of 0 to 15 parts by weight, preferably 0.3 to 15 parts by weight, per 100 parts by weight of the methacrylic monomer. When the amount of the compound (B) is over 15 parts by weight, the product has unfavorably inferior heat resistance, inferior mechanical strength and inferior water resistance, and further occasionally shows a sticky surface.

The alkylene oxide compound (B) has excellent affinity to both methacrylic resin and sulfonate (A), and hence, when it is used in a suitable amount, it can give a methacrylic resin having superior transparency, surface gloss and antistatic properties to the product which is obtained by using a sulfonate (A) alone. A suitable ratio of the alkylene oxide compound (B) to the sulfonate (A) is in the range of 0 to 5 parts, preferably 0.3 to 5 parts by weight to 1 part by weight of the sulfonate (A). When the ratio of the compound (B) to the sulfonate (A) is less than 0.3 by weight, a synergistic effect thereof is not obtained and the resin thus obtained often has insufficient transparency, and on the other hand, when the ratio is over 5% by weight, the resin shows lowered mechanical strength and less antistatic properties.

When an acidic phosphate (C) is incorporated into the composition of the present invention, the product has improved water resistance, i.e. improved maintenance of excellent antistatic properties and transparency.

Suitable examples of the acidic phosphate (C) of the formula (IV) are monomethyl phosphate, dimethyl phosphate, monoethyl phosphate, diethyl phosphate, monopropyl phosphate, dipropyl phosphate, monobutyl phosphate, dibutyl phosphate, monohexyl phosphate, dihexyl phosphate, mono(2-ethylhexyl) phosphate, di(2-ethylhexyl) phosphate, monooctyl phosphate, dioctyl phosphate, monodecyl phosphate, didecyl phosphate, monotridecyl phosphate, ditridecyl phosphate, monostearyl phosphate, distearyl phosphate, monooleyl phosphate, dioleyl phosphate, monophenyl phosphate, diphenyl phosphate, nonylphenyl phosphate, di(nonylphenyl) phosphate, monomethacryloxyethyl phosphate, dimethacryloxyethyl phosphate, or the like, among which monoethyl phosphate, diethyl phosphate, monopropyl phosphate, dipropyl phosphate, monobutyl phosphate, and dibutyl phosphate are particularly preferable.

The acidic phosphate is used in an amount of not more than 5 parts by weight, preferably 0.5 to 5 parts by weight, to 100 parts by weight of the starting acrylic monomer. When the amount of the acidic phosphate is over 5 parts by weight, the obtained resin shows lowered mechanical strength and occasionally shows undesirable bleeding on the resin surface. Among the acidic phosphate, monomethacryloxyethyl phosphate and dimethacryloxyethyl phosphate are copolymerizable with the starting methacrylic monomer and hence are copolymerized within the resin.

The acrylic resin composition of the present invention is prepared by mixing and dissolving 100 parts by weight of an acrylic monomer comprising predominantly methyl methacrylate, 0.5 to 15 parts by weight of a sulfonate (A) of the formula (I) or (II), 0 to 15 parts by weight of an alkylene oxide compound (B) and 0 to 5 parts by weight of an acidic phosphate (C) and optionally other additives and then subjecting the mixture to a polymerization reaction. The polymerization reaction is carried out by a conventional method which is usually used in the preparation of acrylic resin using predominantly methyl methacrylate as the starting monomer, such as bulk polymerization, suspension polymerization and emulsion polymerization, in the presence of a radical polymerization initiator.

The radical polymerization initiator includes azo compounds and organic peroxides, such as 2,2'-azobis(isobutylonitrile), 2,2'-azobis(2,4-dimethylvaleronitrile), 2,2'-azobis(2,4-dimethyl-4-methoxyvaleronitrile), benzoyl peroxide, lauroyl peroxide, or the like. There is also used a Redox polymerization initiator which is a combination of an organic peroxide and an amine. Besides, for emulsion polymerization, there can also be used a water-soluble polymerization initator, such as persulfates (e.g. potassium persulfate, sodium persulfate, ammonium persulfate), hydroperoxides (e.g. butyl hydroperoxide, cumene hydroperoxide), hydrogen peroxide, or the like. The water-soluble polymerization initiator includes also a combination of these persulfates or peroxides and a reductive compound (e.g. sodium bisulfite, or heavy metal salts), which is a Redox polymerization initiator. These polymerization initiators are usually used in an amount of 0.001 to 1% by weight, preferably 0.01 to 0.5% by weight, based on the total weight of the starting monomers. The polymerization temperature may vary depending on the kinds of the polymerization initiator, but is usually in the range of 10° to 150° C., preferably 30° to 90° C.

The polymerization reaction may also be done by first partially polymerizing the starting acrylic monomer comprising predominantly methyl methacrylate to give a partial polymerizate (in the form of a syrup) and adding thereto a sulfonate (A) and other ingredients and then continuing the polymerization reaction.

Among the conventional polymerization methods as mentioned above, bulk polymerization is particularly suitable in view of its easy operation. According to so-called "casting polymerization", the desired antistatic acrylic resin cast plate can easily be prepared.

The casting polymerization is usually carried out as follows. To the starting acrylic monomer, i.e. methyl methacrylate alone, or a monomer comprising predominantly methyl methacrylate, or a partial polymerizate thereof (in the form of a syrup), are added a sulfonate (A), an alkylene oxide (B), an acidic phosphate (C) and other additives, and the mixture is mixed well to give a uniform solution. The solution pe se or after partially polymerizing into the form of a syrup, is admixed with a radical polymerization initiator to give a casting material. The casting material thus prepared is poured between two reinforced glasses which are set face to face, with a space, the periphery thereof being sealed with a gasket, and then subjected to a polymerization reaction with heating. This method is known as "glass cell casting".

Alternatively, the casting material is continuously poured into the space between two metallic endless belts which are run in one direction at a constant speed, one surface of the metallic belt being planished and the periphery of the belts being sealed with a gasket, and then subjected to a polymerization reaction with heating. This method is called "continuous casting". In the present invention, both the glass cell casting and the continuous casting are effectively used.

The methacrylic resin thus obtained has excellent antistatic properties without deteriorating the natural properties of the methacrylic resin, such as transparency, surface gloss, mechanical properties, weatherability, and processability. Moreover, the excellent antistatic properties are changed neither by washing with water nor rubbing, nor with a lapse of time. Thus, the methacrylic resin obtained by the present invention is practically very useful.

The present invention is illustrated by the following Examples, but should not be construed to be limited thereto. In the Examples, "part" and "%" are all part by weight or % by weight unless specified otherwise.

Various properties of the resin plates obtained by the Examples are tested in the following manner.

(1) Antistatic properties:

(a) Surface resistivity: The test plate is allowed to stand under standard conditions of 23° C., 50% humidity for 3 days, and then, the surface resistivity is measured under the same atmosphere with an insulation meter (ULTRAMEGOHMMETER MODEL SH-10E, manufactured by Toa Denpa Kogyo K.K.).

(b) Half-life: It is measured by using a static meter (STATIC HONESTMETER TYPE S-5109, manufactured by Shishido Shokai). Under the same conditions as in (a) above, a voltage of 10 kv is applied to the test plate, and there is measured the period till the charged voltage reduces by half after the applied voltage is made zero.

(2) Transparency:

Total light transmission and haze are measured according to ASTM-D 1003.

(3) Heat resistance:

The heat distortion temperature is measured according to ASTM-D 648.

(4) Mechanical properties:

Tensile strength at break is measured according to ASTM-D 638.

(5) Weatherability:

The test plate is subjected to an accelerated weathering test at 63° C. for 1000 hours with a SUNSHINE WEATHEROMETER (manufactured by Suga Shikenki K.K.), and thereafter, the antistatic properties thereof are measured.

(6) Water resistance:

The test plate is dipped in water at 30° C. for 2 days, and then air-dried. The test plate thus treated is subjected to the measurement of transparency and antistatic properties as above.

(7) Deterioration with time:

The test plate is allowed to stand in a room having a constant temperature of 23° C. and a constant humidity of 50% for 2 months, and thereafter, the surface resistivity and half-life thereof are measured as above.

EXAMPLE 1

Methyl methacrylate (100 parts) is mixed with sodium allyl-tridecylsulfosuccinate (component (A), 2 parts) and polyethylene glycol having a molecular weight of 400 (component (B), 5 parts), and the mixture is dissolved at room temperature, and thereto is added lauroyl peroxide (as a polymerization initiator, 0.2 part). This mixture is poured between a polymerization cell which comprises two glass plates, the periphery thereof being sealed with a polyvinyl chloride gasket, and then, is subjected to polymerization by heating at 67° C. for 6 hours and then at 110° C. for 1 hour to give a resin plate having a thickness of 3 mm.

The resin plate thus obtained was subjected to the tests as mentioned above, and the test data were compared with those which were obtained on a conventional methacrylic resin plate (Sumipex ® 000, manufactured by Sumitomo Chemical Company, Limited). The results are shown in Table 1.

TABLE 1

|  | Resin plate of Example 1 | Conventional methacrylic resin plate |
|---|---|---|
| Antistatic properties: | | |
| Surface resistivity (Ω) | $2.1 \times 10^{10}$ | $10^{16}$ |
| Half-life (second) | 1 | ∞ |
| Transparency: | | |
| Total light transmission (%) | 92.5 | 92.5 |
| Haze (%) | 0.2 | 0.3 |

As is clear from Table 1, the resin plate of Example 1 showed excellent transparency and was superior to conventional methacrylic resin plate in antistatic properties.

Moreover, the resin plate of Example 1 showed a heat distortion temperature of 100° C. and a tensile strength at break of 731 kg/cm$^2$, which means that the heat resistance and mechanical strength as in the conventional methacrylic resin plate were not deteriorated. Besides, after having been subjected to a weatherability test, the resin plate showed a surface resistivity of $4.0 \times 10^{10} \Omega$, and a half-life of 1 second, which means that the antistatic properties were not deteriorated even after a weatherability test. Thus, the product of Example 1 is practically very useful.

EXAMPLE 2

Methyl methacrylate (100 parts) is mixed with sodium allyl-laurylsulfosuccinate (component (A), 2 parts), polyethylene glycol having a molecular weight of 200 (component (B), 5 parts) and JP 504 [a mixture of monobutyl phosphate and dibutyl phosphate, manufactured by Jyohoku Kagaku Kogyo K.K., 1 part, which is an acidic phosphate component (C)]. The mixture is mixed well and dissolved at room temperature, and thereto is added lauryl peroxide (as a polymerization initiator, 0.2 part). The mixture is subjected to the polymerization reaction in the same manner as described in Example 1 to give a resin plate having a thickness of 3 mm. The resin plate thus obtained is colorless and has excellent surface gloss.

When various properties of the resin plate were tested in the methods as described hereinbefore, it showed a total light transmission of 92.9%, a haze of 0.3%, a surface resistivity of $8.5 \times 10^{9} \Omega$, and a half-life of 1 second, showing excellent transparency and antistatic properties. Besides, after having been subjected to the test of water resistance thereof, it showed a total light transmission of 92.6%, a haze of 0.5%, a surface resistivity of $9.0 \times 10^{9} \Omega$, and a half-life of 1 second. Thus, the resin plate could maintain the excellent transparency and antistatic properties even after immersion in water.

EXAMPLES 3 TO 11 AND REFERENCE EXAMPLES 1 TO 5

In the same manner as described in Examples 1 and 2 except that the kinds and amounts of a sulfonate (A), an alkylene oxide compound (B) and an acidic phosphate (C) as shown in Table 2 are used per 100 parts of methyl methacrylate, there are obtained various resin plates (thickness: 3 mm).

The transparency, antistatic properties, mechanical strength, and water resistance of the resin plates were tested in the same manner as described above. The results are shown in Table 3.

TABLE 2

| | Sulfonate (A) | | Alkylene oxide (B) | | Acidic Phosphate (C) | |
|---|---|---|---|---|---|---|
| Example No. | Kind | Amount (part) | Kind | Amount (part) | Kind | Amount (part) |
| Ex. 3 | Sodium allyl-tridecylsulfosuccinate | 2 | Triethylene glycol | 4 | — | |
| Ex. 4 | Sodium allyl-tridecylsulfo | 2 | Polyethylene glycol | 4 | — | |

TABLE 2-continued

| Example No. | Sulfonate (A) Kind | Amount (part) | Alkylene oxide (B) Kind | Amount (part) | Acidic Phosphate (C) Kind | Amount (part) |
|---|---|---|---|---|---|---|
| | succinate | | (M.W. 200) | | | |
| Ex. 5 | Sodium allyl-tridecylsulfo-succinate | 2 | Polyethylene glycol (M.W. 200) | 7 | — | |
| Ex. 6 | Sodium allyl-tridecylsulfo-succinate | 3 | Polyethylene glycol (M.W. 200) | 6 | — | |
| Ex. 7 | Sodium allyl-tridecylsulfo-succinate | 2 | Polyethylene glycol (M.W. 1000) | 5 | — | |
| Ex. 8 | Potassium allyl-butylsulfo-succinate | 2.5 | Polyethylene glycol (M.W. 600) | 5 | — | |
| Ex. 9 | Sodium methallyl-laurylsulfo-succinate | 1.5 | Polyethylene glycol (M.W. 300) | 6 | — | |
| Ex. 10 | Sodium allyl-tridecylsulfo-succinate | 2 | Polyethylene glycol (M.W. 200) | 4 | Dibutyl phosphate | 1.0 |
| Ex. 11 | Sodium allyl-tridecylsulfo-succinate | 3 | Polyethylene glycol (M.W. 200) | 6 | Diethyl phosphate | 1.5 |
| Ref. Ex. 1 | Sodium allyl-tridecylsulfo-succinate | 2 | — | | — | |
| Ref. Ex. 2 | — | | Polyethylene glycol (M.W. 200) | 7 | — | |
| Ref. Ex. 3 | Sodium allyl-tridecylsulfo-succinate | 2 | Polyethylene glycol (M.W. 200) | 18 | — | |
| Ref. Ex. 4 | Sodium allyl-tridecylsulfo-succinate | 2 | Polyethylene glycol (M.W. 4000) | 5 | — | |
| Ref. Ex. 5 | — | | — | | Dibutyl phosphate | 3 |

TABLE 3

| | Transparency | | Antistatic properties | | | Water resistance | | |
|---|---|---|---|---|---|---|---|---|
| Example No. | Appearance (naked eyes) | Haze (%) | Surface resistivity ($\Omega$) | Half-life (second) | Tensile strength at break (kg/cm$^2$) | Haze (%) | Surface resistivity ($\Omega$) | Half-life (second) |
| Ex. 3 | Colorless transparent | 0.3 | $1.6 \times 10^{10}$ | 1 | 711 | 3.3 | $5.3 \times 10^{10}$ | 2 |
| Ex. 4 | Colorless transparent | 0.2 | $2.2 \times 10^{10}$ | 2 | 695 | 1.4 | $2.0 \times 10^{10}$ | 2 |
| Ex. 5 | Colorless transparent | 0.1 | $4.0 \times 10^{9}$ | 1 | 654 | 4.9 | $1.5 \times 10^{10}$ | 1 |
| Ex. 6 | Colorless transparent | 0.5 | $8.0 \times 10^{9}$ | 1 | 630 | 6.8 | $0.7 \times 10^{10}$ | 1 |
| Ex. 7 | Colorless transparent | 2.6 | $3.7 \times 10^{10}$ | 2 | 693 | 8.8 | $2.4 \times 10^{10}$ | 2 |
| Ex. 8 | Colorless transparent | 1.1 | $1.0 \times 10^{10}$ | 1 | 698 | 7.4 | $4.0 \times 10^{10}$ | 2 |
| Ex. 9 | Colorless transparent | 0.1 | $1.8 \times 10^{11}$ | 3 | 671 | 4.2 | $8.5 \times 10^{10}$ | 2 |
| Ex. 10 | Colorless transparent | 0.2 | $7.5 \times 10^{9}$ | 1 | 685 | 0.3 | $1.0 \times 10^{10}$ | 1 |
| Ex. 11 | Colorless transparent | 0.4 | $9.5 \times 10^{8}$ | 1> | 612 | 1.2 | $3.0 \times 10^{9}$ | 1 |
| Ref. Ex. 1 | Translucent | 62.8 | $1.2 \times 10^{11}$ | 2 | 728 | — | — | — |
| Ref. Ex. 2 | Colorless transparent | 0.2 | $1.3 \times 10^{14}$ | 60< | 665 | 4.2 | $1.4 \times 10^{15}$ | 60< |
| Ref. Ex. 3 | Bleeding | 0.2 | $1.0 \times 10^{10}$ | 2 | 320 | 58.6 | $5.5 \times 10^{12}$ | 60< |
| Ref. Ex. 4 | Opaque | 92.0 | $1.6 \times 10^{10}$ | 1 | 638 | — | — | — |
| Ref. Ex. 5 | Colorless transparent | 0.2 | $1.2 \times 10^{14}$ | 60< | 741 | 0.3 | $1.0 \times 10^{15}$ | 60< |

EXAMPLES 12 TO 20

In the same manner as described in Examples 1 and 2 except that the kinds and amounts of a sulfonate (A), an alkylene oxide compound (B) and an acidic phosphate (C) as shown in Table 4 are used per 100 parts of a monomer mixture consisting of 99 parts of methyl methacrylate and 1 part of methyl acrylate, there are obtained various resin plates (thickness: 3 mm).

The transparency, antistatic properties, mechanical strength, and water resistance of the resin plates were tested in the same manner as described above. The results are shown in Table 5.

TABLE 4

| Example No. | Sulfonate (A)* Kind | Amount (part) | Alkylene oxide (B) Kind | Amount (part) | Acidic Phosphate (C) Kind | Amount (part) |
|---|---|---|---|---|---|---|
| Ex. 12 | (a) | 2 | Polyethylene glycol (M.W. 400) | 1 | — | |
| Ex. 13 | (a) | 4 | Polyethylene glycol (M.W. 400) | 4 | — | |
| Ex. 14 | (a) | 2.5 | Polyethylene glycol butyl ether (M.W. 200) | 2.5 | — | |
| Ex. 15 | (a) | 2.5 | Polyethylene glycol nonylphenyl ether (M.W. 350) | 2.5 | — | |
| Ex. 16 | (a) | 2.5 | Methoxypolyethylene glycol monomethacrylate (M.W. 350) | 2.5 | — | |
| Ex. 17 | (b) | 3 | Polyethylene glycol (M.W. 200) | 6 | — | |
| Ex. 18 | (c) | 3 | Polyethylene glycol (M.W. 200) | 1 | — | |
| Ex. 19 | (a) | 2 | Polyethylene glycol (M.W. 400) | 1 | Diisopropyl phosphate | 0.5 |
| Ex. 20 | (a) | 4 | Polyethylene glycol (M.W. 400) | 4 | Monobutyl phosphate | 1 |

*The sulfonates (A) are as follows:

(a) $\begin{array}{c} CH_2COO(CH_2CH_2O)_9C_{12}H_{25} \\ | \\ NaO_3S-CH-COOCH_2CH=CH_2 \end{array}$ (b) $\begin{array}{c} CH_2-COO(CH_2CH_2O)_4C_{12}H_{25} \\ | \\ NaO_3S-CH-COOCH_2C=CH_2 \\ | \\ CH_3 \end{array}$ (c) $\begin{array}{c} CH_2-COO(CH_2CH_2O)_9C_4H_7 \\ | \\ KO_3S-CH-COO(CH_2CH_2O)_9CH_2CH=CH_2 \end{array}$

TABLE 5

| | | | Antistatic properties | | Tensile strength | Water resistance | | |
|---|---|---|---|---|---|---|---|---|
| | Transparency | | Surface | | | | Surface | |
| Example No. | Appearance (naked eyes) | Haze (%) | resistivity (Ω) | Half-life (second) | at break (kg/cm²) | Haze (%) | resistivity (Ω) | Half-life (second) |
| Ex. 12 | Colorless transparent | 0.1 | $5.5 \times 10^{10}$ | 2 | 725 | 2.7 | $5 \times 10^{10}$ | 1 |
| Ex. 13 | Colorless transparent | 1.6 | $1.5 \times 10^8$ | 1> | 655 | 27.2 | $0.9 \times 10^9$ | 1 |
| Ex. 14 | Colorless transparent | 0.1 | $9 \times 10^9$ | 1 | 663 | 1.4 | $1.5 \times 10^{10}$ | 1 |
| Ex. 15 | Colorless transparent | 0.2 | $1.3 \times 10^{10}$ | 1 | 664 | 1.3 | $2.8 \times 10^{10}$ | 2 |
| Ex. 16 | Colorless transparent | 0.5 | $2.1 \times 10^{10}$ | 2 | 690 | 1.7 | $2.5 \times 10^{10}$ | 2 |
| Ex. 17 | Colorless transparent | 0.5 | $1.7 \times 10^9$ | 1 | 611 | 3.8 | $1.6 \times 10^9$ | 1 |
| Ex. 18 | Colorless transparent | 0.4 | $3.6 \times 10^9$ | 1 | 715 | 1.8 | $4.1 \times 10^9$ | 1 |
| Ex. 19 | Colorless transparent | 0.1 | $5.0 \times 10^{10}$ | 2 | 722 | 0.5 | $3.8 \times 10^{10}$ | 2 |
| Ex. 20 | Colorless transparent | 0.8 | $5.0 \times 10^8$ | 1> | 650 | 1.5 | $1.2 \times 10^9$ | 1> |

EXAMPLE 21

To a monomer mixture (100 parts) consisting of 65 methyl methacrylate (97 parts) and ethyl cellosolve methacrylate (3 parts) are added a monomer (component (A), 2.5 parts) of the formula:

$$\begin{array}{c} CH_2-COO(CH_2CH_2O)_9C_8H_{17} \\ | \\ NaO_3S-CH-COOCH_2CH=CH_2 \end{array}$$

and a polyalkylene glycol monomethacrylate (component (B), 3 parts), the polyalkylene glycol monomethacrylate being a random copolymer of ethylene oxide and tetrahydrofuran (55:45 by weight) and having a molecular weight of 800. The mixture is dissolved at room temperature, and thereto is added azobisisobutyronitrile (as a polymerization initiator, 0.1 part). The mixture is subjected to a polymerization reaction by heating at 70° C. for 5 hours and further at 110° C. for 1 hour in the same manner as described in Example 1 to give a resin plate having a thickness of 3 mm.

The resin plate thus obtained was colorless and transparent and showed a surface resistivity of $3.5 \times 10^{10}$ Ω, a half-life of 2 seconds (excellent antistatic properties). Besides, the resin plate had a heat distortion temperature of 96° C., a tensile strength at break of 725 kg/cm². Thus, it could maintain excellent heat resistance and mechanical properties which are usually typical of conventional methacrylic resin plates.

EXAMPLE 22

To a monomer mixture (100 parts) consisting of methyl methacrylate (98 parts) and tetrahydrofurfuryl methacrylate (2 parts) are added potassium allyl-lauryl-sulfosuccinate (component (A), 2.5 parts), polyethylene glycol having a molecular weight of 200 (component (B), part) and JP-504 (a mixture of monobutyl phosphate and dibutyl phosphate, manufactured by Jyohoku Kagaku Kogyo K.K., as an acidic phosphate (C), 1 part). The mixture is dissolved at room temperature, and thereto is added lauroyl peroxide (a polymerization initiator, 0.2 part). The mixture is subjected to a polymerization reaction in the same manner as described in Example 1 to give a resin plate having a thickness of 3 mm. The resin plate thus obtained is colorless and transparent.

When the resin plate was subjected to various tests in the same manner as in Example 1, it showed a surface resistivity of $1.4 \times 10^{10}$ Ω, and a half-life of 1 second (excellent antistatic properties). Besides, after having been subjected to the test of water resistance thereof, it showed a total light transmission of 92.6%, a haze of 0.8%, a surface resistivity of $4 \times 10^{10}$ Ω, and a half-life of 1 second. Thus, the resin plate could maintain excellent transparency and antistatic properties even after immersion in water.

EXAMPLE 23

Methyl methacrylate (100 parts) and a sulfonate (component (A), 1.5 part) of the formula:

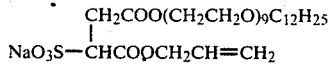

are mixed and dissolved at room temperature, and thereto is added lauroyl peroxide (a polymerization initiator, 0.2 part). The mixture is poured into a polymerization cell comprising two glass plates and a polyvinyl chloride gasket sealing, and then, is subjected to polymerization by heating at 67° C. for 6 hours and then at 110° C. for 1 hour to give a resin plate having a thickness of 3 mm.

The resin plate thus obtained was subjected to various tests as described hereinbefore and the data were compared with those of a conventional methacrylic resin plate (Sumipex ®0000, manufactured by Sumitomo Chemical Company, Limited). The results are shown in Table 6.

TABLE 6

|  | Resin plate of Example 23 | Conventional methacrylic resin plate |
|---|---|---|
| Antistatic properties: |  |  |
| Surface resistivity (Ω) | $5.5 \times 10^{11}$ | $10^{16} <$ |
| Half-life (second) | 2 | ∞ |
| Transparency: |  |  |
| Total light transmission (%) | 92.7 | 92.5 |
| Haze (%) | 0.3 | 0.3 |

As is clear from Table 6, the resin plate of Example 23 showed the same excellent transparency and was superior to the conventional methacrylic resin plate in antistatic properties.

Moreover, the resin plate of Example 23 showed a heat distortion temperature of 106° C. and a tensile strength at break of 750 kg/cm², which means that the heat resistance and mechanical strength as in the conventional methacrylic resin plate were not deteriorated. Besides, after having been subjected to a weatherability test, the resin plate showed a surface resistivity of $3.1 \times 10^{11}$ Ω, and a half-life of 2 seconds, which means that the antistatic properties were not deteriorated even after a weatherability test. Thus, the product of Example 1 is practically very useful.

EXAMPLES 24 to 30 AND REFERENCE EXAMPLES 6 to 8

In the same manner as described in Example 23 except that the kinds and amounts of sulfonates (A) are varied as shown in Table 7, there are obtained various resin plates.

Various properties of the resin plates, such as transparency, antistatic properties, mechanical properties and water resistance were tested by the methods as described hereinbefore. The results are shown in Table 8.

TABLE 7

| Example No. | Amount of methyl methacrylate (part) | Sulfonate (A)* Kind | Amount (part) |
|---|---|---|---|
| Ex. 24 | 100 | (d) m = 3 | 2 |
| Ex. 25 | 100 | (d) m = 9 | 2 |
| Ex. 26 | 100 | (d) m = 23 | 2 |
| Ex. 27 | 100 | (d) m = 9 | 4 |
| Ex. 28 | 100 | (e) | 2.5 |
| Ex. 29 | 100 | (f) | 3 |
| Ex. 30 | 100 | (f) | 8 |
| Ref. Ex. 6 | 100 | (d) m = 9 | 0.3 |
| Ref. Ex. 7 | 100 | (d) m = 9 | 20 |
| Ref. Ex. 8 | 100 | (d) m = 40 | 2 |

*Sulfonates (A) are as follows:

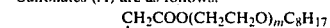
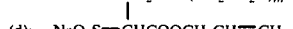
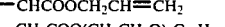
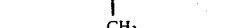
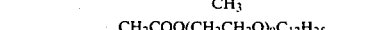

TABLE 8

| Example No. | Transparency Appearance (naked eyes) | Haze (%) | Antistatic properties Surface resistivity (Ω) | Half-life (second) | Tensile strength at break (kg/cm²) | Water resistance Haze (%) | Surface resistivity (Ω) | Half-life (second) |
|---|---|---|---|---|---|---|---|---|
| Ex. 24 | Colorless transparent | 0.3 | $1.6 \times 10^{10}$ | 1 | 680 | 1.3 | $5.0 \times 10^{10}$ | 1 |
| Ex. 25 | Colorless transparent | 0.5 | $7.0 \times 10^{10}$ | 2 | 695 | 2.3 | $7.6 \times 10^{10}$ | 2 |
| Ex. 26 | Colorless transparent | 1.0 | $8.5 \times 10^{10}$ | 2 | 688 | 2.7 | $0.9 \times 10^{11}$ | 3 |
| Ex. 27 | Colorless transparent | 1.8 | $1.2 \times 10^{9}$ | 1> | 680 | 4.6 | $1.4 \times 10^{9}$ | 1 |
| Ex. 28 | Colorless transparent | 0.3 | $3.5 \times 10^{10}$ | 1 | 730 | 1.8 | $5.9 \times 10^{10}$ | 2 |
| Ex. 29 | Colorless transparent | 0.5 | $6.5 \times 10^{9}$ | 1 | 664 | 2.8 | $1.7 \times 10^{9}$ | 1> |
| Ex. 30 | Colorless transparent | 4.6 | $3.0 \times 10^{7}$ | 1> | 640 | 25.7 | $2.5 \times 10^{10}$ | 1> |
| Ref. Ex. 6 | Colorless transparent | 0.3 | $3.3 \times 10^{14}$ | 60< | 760 | 0.5 | $3.5 \times 10^{14}$ | 60< |
| Ref. Ex. 7 | Opaque | 88.0 | $1.1 \times 10^{7}$ | 1> | 520 | — | — | — |
| Ref. Ex. 8 | Translucent | 72.8 | $4.5 \times 10^{10}$ | 1 | 651 | — | — | — |

EXAMPLE 31

Methyl methacrylate (98 parts) and ethyl methacrylate (2 parts) charged into a flask and are dissolved at room temperature. To the mixture is added azobisisobutyronitrile (a polymerization initiator, 0.01 part), and the mixture is stirred at a low speed for about one hour in an oil bath at 70° C. to give a partial polymerizate having a viscosity of 1 poise (in the form of a syrup). In the syrup are dissolved sodium allyl-tridecylsulfosuccinate (component (A), 2 parts) and titanium oxide (0.7 part), and thereto is added azobisisobutyronitrile (a polymerization initiator, 0.1 part). The mixture is poured into a polymerization cell which comprises two glass plates and a polyvinyl chloride gasket, and then is subjected to a polymerization reaction at 70° C. for 5 hours and then at 110° C. for 1 hour to give a resin plate having a thickness of 3 mm. The resin plate is white and has an excellent surface gloss.

As a result of the testing as described hereinbefore, the resin plate had a surface resistivity of $1.2 \times 10^{11}$, a half-life of 2 seconds (excellent antistatic properties), a heat distortion temperature of 102° C., and a tensile strength at break of 705 kg/cm². Thus, it did not lose the excellent heat resistance and mechanical properties which are possessed by the conventional methacrylic resin plate.

EXAMPLE 32

Methyl methacrylate (100 parts) is mixed with a sulfonate (A) (2 parts) of the formula:

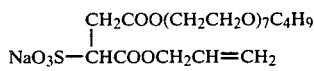

and an acidic phosphate (C) (JP-504, manufactured by Jyohoku Kagaku Kogyo K.K., a mixture of monobutyl phosphate and dibutyl phosphate, 1 part), and the mixture is dissolved at room temperature, and thereto is added lauroyl peroxide (as a polymerization initiator, 0.2 part). This mixture is poured between a polymerization cell which comprises two glass plates, the periphery thereof being sealed with a polyvinyl chloride gasket, and then, is subjected to polymerization by heating at 67° C. for 6 hours and then at 110° C. for 1 hour to give a resin plate having a thickness of 3 mm which is colorless and transparent and has an excellent gloss surface.

The resin plate thus obtained was subjected to the tests as mentioned above, and the test data were compared with those which were obtained on a conventional methacrylic resin plate (Sumipex ®0000, manufactured by Sumitomo Chemical Company, Limited). The results are shown in Table 9.

TABLE 9

| | Resin plate of Example 32 | Conventional methacrylic resin plate |
|---|---|---|
| Antistatic properties: | | |
| Surface resistivity (Ω) | $3.6 \times 10^{10}$ | $10^{16}<$ |
| Half-life (second) | 1 | ∞ |
| Transparency: | | |
| Total light transmission (%) | 92.5 | 92.5 |
| Haze (%) | 0.3 | 0.3 |

As is clear from Table 9, the resin plate of Example 1 showed the same excellent transparency as and was superior to the conventional methacrylic resin plate in the antistatic properties.

Moreover, the resin plate of Example 32 showed a heat distortion temperature of 105° C. and a tensile strength at break of 722 kg/cm², which means that the heat resistance and mechanical strength as in the conventional methacrylic resin plate were not deteriorated. Besides, after having been subjected to the test of water resistance thereof, it showed a total light transmission of 92.5%, a haze of 0.4%, a surface resistivity of $5 \times 10^{10} \Omega$, and a half-life of 1 second. Thus, the resin plate could maintain excellent transparency and antistatic properties even after immersion in water.

EXAMPLES 33 TO 35 AND REFERENCE EXAMPLES 9 TO 10

In the same manner as described in Examples 32 except that the kinds and amounts of a sulfonate (A) and an acidic phosphate (C) as shown in Table 10 are varied, there are obtained various resin sheets (thickness: 3 mm).

The transparency, antistatic properties, mechanical strength, and water resistance of the resin plates were tested in the same manner as described above. The results are shown in Table 11.

TABLE 10

| Example No. | Amount of methyl methacrylate (part) | Sulfonate (A)* Kind | Sulfonate (A)* Amount (part) | Acidic phosphate (C) Kind | Acidic phosphate (C) Amount (part) |
|---|---|---|---|---|---|
| Ex. 33 | 100 | (d) m = 9 | 2 | Dibutyl phosphate | 0.5 |
| Ex. 34 | " | (d) m = 9 | 4 | " | 1 |
| Ex. 35 | " | (f) | 3 | Diethyl phosphate | 2 |
| Ref. Ex. 9 | 100 | (d) m = 9 | 2 | Dibutyl phosphate | 7 |
| Ref. Ex. 10 | " | — | — | " | 3 |

*The sulfonates (A), (d) and (f) are the same as in Table 7.

TABLE 11

| | Transparency | Transparency | Antistatic properties Surface | Antistatic properties | Tensile strength at break (kg/cm$^2$) | Water resistance | Water resistance Surface | Water resistance |
|---|---|---|---|---|---|---|---|---|
| Example No. | Appearance (naked eyes) | Haze (%) | resistivity (Ω) | Half-life (second) | | Haze (%) | resistivity (Ω) | Half-life (second) |
| Ex. 33 | Colorless transparent | 0.4 | 5.5 × 10$^{10}$ | 2 | 730 | 0.4 | 5.0 × 10$^{10}$ | 2 |
| Ex. 34 | Colorless transparent | 0.5 | 3.7 × 10$^8$ | 1> | 670 | 0.8 | 5.6 × 10$^8$ | 1> |
| Ex. 35 | Colorless transparent | 0.3 | 2.7 × 10$^7$ | 1> | 728 | 0.5 | 4.7 × 10$^7$ | 1 |
| Ref. Ex. 9 | Bleeding | 0.4 | 6.0 × 10$^9$ | 1 | 600 | 0.3 | 1.7 × 10$^{13}$ | 60< |
| Ref. Ex. 10 | Colorless Transparent | 0.2 | 1.3 × 10$^{15}$ | 60< | 740 | 0.3 | 1.0 × 10$^{16}$ | 60< |

EXAMPLE 36

To a monomer mixture (100 parts) consisting of methyl methacrylate (95 parts) and tetrahydrofurfuryl methacrylate (5 parts) are added potassium methallyllaurylsulfosuccinate (A) (0.5 part), a monomer (component (A), 2.5 parts) of the formula:

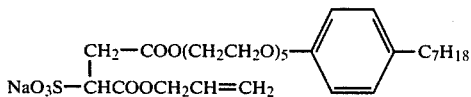

and an acidic phosphate (C) (AP-3, manufactured by Daihachi Kagaku Kogyo K.K., a mixture of monoisopropyl phosphate and diisopropyl phosphate, 1.5 part) and AC Black (manufactured by Tokyo Ink K.K.). The mixture is dissolved at room temperature, and thereto is added lauroyl peroxide (0.2 part). The mixture is subjected to a polymerization reaction in the same manner as described in Example 32 to give a resin plate having a thickness of 3 mm.

The resin plate thus obtained was black and showed a surface resistivity of 1.2×10$^{10}$Ω, a half-life of 1 second (excellent antistatic properties). Besides, after having been subjected to the test of water resistance thereof, it showed excellent surface gloss and a surface resistivity of 2.4×10$^{10}$Ω, and a half-life of 1 second. Thus, the resin plate could maintain the excellent transparency and antistatic properties even after immersion in water.

EXAMPLE 37

An aqueous solution (100 parts) of 40% Sulfonate (A) containing 50% of a sulfonate of the formula (I) wherein the alkali metal is sodium, n is 0, R$^2$ is the hydrogen atom, and R$^1$ is an alkyl group having 12 carbon atoms and 50% of a sulfonate of the formula (I) wherein alkali metal, n and R$^2$ are the same as above and R$^1$ is an alkyl group having 13 carbon atoms (Eleminol ® JS-2, trademark for 40% solution, manufactured by Sanyo Kasei K.K.) is charged into a vessel provided with a stirrer. The vessel is dipped in an oil bath and carefully heated with stirring while keeping the inner temperature below 100° C., by which water is distilled off. The resulting solid material (I) is starch jelly like material and has a water content of 2%.

Into methyl methacrylate partial polymerizate (in the form of syrup) (292 parts), in which polymethyl methacrylate (reduced viscosity: 4.2 dl/g) (1.2 part) is dissolved, is uniformly dispersed titanium oxide (1.5 part), and therein are dissolved the solid material (I) obtained above (6 parts) and 2,2'-azobisisobutyronitrile (0.3 part). After purging dissolved air under reduced pressure, the mixture is poured into a cell which is formed by two reinforced glasses (distance between the glasses: 3 mm) which is spaced with an elastic gasket provided on the periphery thereof, and then subjected to a polymerization reaction at 57° C. for 15 hours, at 80° C. for 3 hours and further at 80° C. for 2 hours to give a methacrylic resin cast plate having a thickness of 3 mm which has a beautiful, gloss, uniform white color.

This cast plate had a surface resistivity of 1.2×10$^{11}$ Ω, and a half-life of 2 seconds, and the antistatic properties of this product were not deteriotated even by washing with water or with time.

EXAMPLE 38

An aqueous solution (100 parts) containing 40% of the same sulfonate (A) as used in Example 37 is charged into a vessel provided with a stirrer, and thereto is added 1,1,3-tris(2-methyl-5-t-butyl-4-hydroxyphenyl)-butane (0.004 part). The mixture is carefully heated with stirring while keeping the inner temperature below 100° C. The resulting solid material (II) is a starch jelly like material and has a water content of 2%.

The solid material (II) (6 parts) and 2,2'-azobisisobutyronitrile (0.3 part) are dissolved in the same syrup (293.5 parts) as used in Example 37 which is dispersed with titanium oxide. The mixture is subjected to a polymerization reaction in the same manner as described in Example 37 to give a white cast plate having a thickness of 3 mm. This cast plate has more beautiful gloss than that of the cast plate obtained in Example 37 and has wholly uniform color.

The cast plate showed a surface resistivity of $1.2 \times 10^{11}\Omega$, and a half-life of 2 seconds, and the antistatic properties thereof were not deteriorated even by washing with water or with time.

EXAMPLE 39

In methyl methacrylate (276 parts) are dissolved the solid material (I) (6 parts) obtained in Example 37, a polyethylene glycol having a molecular weight of 200 (18 parts) and 2,2'-azobisisobutyronitrile (0.003 part), and the mixture is subjected to a polymerization reaction at 80° C. for 2 hours to give a syrup having a viscosity of 5 poises.

In this syrup is dissolved additional 2,2'-azobisisobutyronitrile (0.3 part), and the mixture is polymerized under the same conditions as in Example 37 to give a methacrylic resin cast plate having beautiful gloss transparency and a thickness of 3 mm.

This cast plate had a surface resistivity of $2.2 \times 10^{10}\Omega$, a half-life of 1 second, a total light transmission of 92%, and a haze of 2%, and the antistatic properties and optical properties thereof were not deteriorated even by washing with water.

EXAMPLE 40

In the same manner as described in Example 40 except that the solid material (II) obtained in Example 38 is used instead of the solid material (I), there is obtained a methacrylic resin cast plate having beautiful gloss transparency and a thickness of 3 mm.

This cast plate had a surface resistivity of $2.1 \times 10^{10}\Omega$, a half-life of 1 second, a total light transmission of 92.5%, and a haze of 2%, and the antistatic properties and optical properties thereof were not deteriorated even by washing with water.

EXAMPLE 41

In methyl methacrylate (276 parts) are dissolved the solid material (II) (6 parts) obtained in Example 38, n-butoxypolyethylene glycol having a molecular weight of oxyalkylene group of 200 (18 parts) and 2,2'-azobisisobutyronitrile (0.003 part), and the mixture is polymerized at 80° C. for 2 hours to give a syrup having a viscosity of 5 poises.

In this syrup are dissolved a fluorescent agent (Sumiplast®Yellow-FL-7G, manufactured by Sumitomo Chemical Company, Limited, 0.015 part) and 2,2'-azobisisobutyronitrile (0.3 part), and the mixture is polymerized under the same conditions as in Example 37 to give a methacrylic resin cast plate having beautiful gloss transparent, fluorescent green color and a thickness of 3 mm.

This cast plate had a surface resistivity of $2.5 \times 10^{11}\Omega$, a half-life of 2 seconds, a total light transmission of 92.7%, and a haze of 1.3%, and the antistatic properties and optical properties thereof were not deteriorated even by washing with water and with time.

EXAMPLE 42

An aqueous solution (100 parts) containing 40% of the same sulfonate (A) as used in Example 37, a hydroquinone monomethyl ether (0.002 part) and a polyethylene glycol having a molecular weight of 200 (112 parts) are charged into a vessel provided with a stirrer, and the mixture is carefully heated with stirring while keeping the inner temperature below 110° C. The resulting solid material (III) containing polyethylene glycol is in the form of a syrup and has a water content of 1.5%.

The solid material (III) (29 parts) and 2,2'-azobisisobutyronitrile (0.003 part) are dissolved in methyl methacrylate (271 parts). The mixture is polymerized at 80° C. for 2 hours to give a syrup having a viscosity of 5 poises.

In the syrup is dissolved additional 2,2'-azobisisobutyronitrile (0.3 part), and the mixture is polymerized under the same conditions as in Example 37 to give a methacrylic resin cast plate having beautiful gloss transparency and a thickness of 3 mm.

The cast plate showed a surface resistivity of $1.1 \times 10^{10}\Omega$, a half-life of 1 second, a total light transmission of 92.7%, and a haze of 0.3%, and the antistatic properties thereof were not deteriorated even by washing with water or with time.

EXAMPLE 43

Into a methyl methacrylate partial polymer (in the form of a syrup) (1.5 part), in which polymethyl methacrylate (reduced viscosity: 4.2 dl/g, 1.1 part) is dissolved, is uniformly dispersed titanium oxide (1.5 part), and therein are dissolved the polyethylene glycol-containing solid material (III) (29 parts) obtained in Example 42 and 2,2'-azobisisobutyronitrile (0.3 part). The mixture is polymerized under the same conditions as in Example 37 to give a methacrylic resin cast plate having beautiful gloss, uniform white color and a thickness of 3 mm.

The cast plate showed a surface resistivity of $3 \times 10^{10}\Omega$, a half-life of 1 second, and the antistatic properties thereof were not deteriorated even by washing with water or with time.

EXAMPLE 44

An aqueous solution (100 parts) containing 40% of the same sulfonate (A) as used in Example 37 and 2,4-dimethyl-6-t-butylphenol (0.005 part) are charged into a vessel provided with a stirrer, and the mixture is carefully heated with stirring in an oil bath while keeping the inner temperature below 100° C., by which water is distilled off. The resulting solid material (IV) is a starch jelly like material and has a water content of 2%.

In methyl methacrylate (266 parts) are dissolved the solid material (IV) (9 parts), a polyethylene glycol having a molecular weight of 400 (25 parts) and 2,2'-azobisisobutyronitrile (0.003 part). The mixture is polymerized at 80° C. for 2 hours to give a syrup having a viscosity of 5 poises.

In the syrup is dissolved additional 2,2'-azobisisobutyronitrile (0.3 part), and the mixture is polymerized under the same conditions as in Example 37 to give a methacrylic resin cast plate having beautiful gloss transparency and a thickness of 3 mm.

The cast plate showed a surface resistivity of $7.5 \times 10^{9}\Omega$, a half-life of 1 second, a total light transmission of 92.8%, and a haze of 0.3%, and the antistatic properties and optical properties thereof were not deteriorated even by washing with water or with time.

EXAMPLE 45

In methyl methacrylate (265 parts) are dissolved the solid material (IV) (12 parts) obtained in Example 44, a polyethylene glycol having a molecular weight of 400 (23 parts) and 2,2'-azobisisobutyronitrile (0.003 part), and the mixture is polymerized at 80° C. for 2 hours to give a syrup having a viscosity of 5 poises.

In this syrup are dissolved additional 2,2'-azobisisobutyronitrile (0.3 part), and the mixture is polymerized under the same conditions as in Example 37 to give a methacrylic resin cast plate having beautiful gloss transparency and a thickness of 3 mm.

This cast plate had a surface resistivity of $6.5 \times 10^8 \Omega$, a half-life of 1 second, a total light transmission of 93.1%, and a haze of 0.5%, and the antistatic properties and optical properties thereof were not deteriorated even by washing with water and with time.

Example 46

An isopropyl alcohol solution (100 parts, solid content: 40%), containing 50% of a sulfonate of the formula (I) wherein alkali metal is sodium, X is ethylene oxide, n is 9, $R^2$ is a hydrogen atom, and $R^1$ is an alkyl group having 12 carbon atoms and 50% of a sulfonate of the formula (I) wherein alkali metal, X, n and $R^2$ are the same as above and $R^1$ is an alkyl group having 13 carbon atoms is charged into a vessel provided with a stirrer. The vessel is dipped in an oil bath and carefully heated with stirring while keeping the inner temperature below 90° C., by which isopropyl alcohol is distilled off. The resulting solid material (V) is in the form of a syrup and has an isopropyl alcohol content of less than 0.1%.

In methyl methacrylate partial polymerizate (in the form of syrup) (294 parts), in which polymethyl methacrylate (reduced viscosity: 4.2 dl/g) (1.2 part) is dissolved, are dissolved the solid material (V) obtained above (6 parts) and 2,2'-azobisisobutyronitrile (0.3 part). The mixture is polymerized under the same conditions as in Example 37 to give a methacrylic resin cast plate having beautiful gloss transparency and a thickness of 3 mm.

This cast plate had a surface resistivity of $5.5 \times 10^{10} \Omega$, and a half-life of 1 second, a total light transmission of 92.7%, and haze of 0.2% (excellent transparency), and the antistatic properties and optical properties of this product were not deteriotated even by washing with water or with time.

REFERENCE EXAMPLE 11

An aqueous solution (100 parts) containing 40% of the same sulfonate (A) as used in Example 37 is charged into a vessel provided with a stirrer, and the mixture is heated with stirring to distill off water, wherein the inner temperature is 140° C. The resulting solid material (VI) is a starch jelly like material and has a water content of 2%.

The solid material (VI) (6 parts) and 2,2'-azobisisobutyronitrile (0.3 part) are dissolved in the same syrup (293.5 parts) as used in Example 37 which is dispersed with titanium oxide. The mixture is subjected to a polymerization reaction in the same manner as described in Example 37 to give a white cast plate having a thickness of 3 mm.

This white cast plate has practically no gloss and has wholly noneven color.

REFERENCE EXAMPLE 12

In the same manner as described in Example 39 except that the solid material (VI) (6 parts) obtained in Reference Example 11 is used instead of the solid material (I), there is obtained a transparent cast plate having a thickness of 3 mm.

This cast plate showed practically no gloss, and had a total light transmission of 93.2% and a haze of 24.2%. Thus, the transparency of this product was also inferior.

REFERENCE EXAMPLE 13

In the same manner as described in Example 39 except that a polyethylene glycol having a molecular weight of 2000 (18 parts) is used instead of the polyethylene glycol having a molecular weight of 200, there is obtained a transparent cast plate having a thickness of 3 mm.

This cast plate had a total light transmission of 93% and a haze of 72%. Thus, the transparency of this product was also inferior.

REFERENCE EXAMPLE 14

In the same manner as described in Example 41 except that the solid material (VI) obtained in Reference Example 11 is used instead of the solid material (II), there is obtained a transparent, fluorescent green color cast plate having a thickness of 3 mm.

This cast plate had practically no gloss and the fluorescent green color thereof was not wholly uniform, and it had a total light transmission of 93.4% and a haze of 16.3%. Thus, the transparency of this product was also bad.

REFERENCE EXAMPLE 15

An aqueous solution (100 parts) containing 40% of the same sulfonate (A) as used in Example 37, 1,1,3-tris(2-methyl-5-t-butyl-4-hydroxyphenyl)butane (0.004 part) and a polyethylene glycol having a molecular weight of 200 (112 pats) are charged into a vessel provided with a stirrer. The vessel is dipped in an oil bath and heated with stirring to distill off water, wherein the inner temperature becomes 150° C. The resulting polyethylene glycol-containing solid material (VII) is in the form of a syrup and has a water content of 1.5%.

The solid material (VII) (29 parts) and 2,2'-azobisisobutyronitrile (0.3 part) are dissolved in the same syrup (270.5 parts) as used in Example 43 which is dispersed with titanium oxide. The mixture is subjected to polymerization reaction in the same manner as described in Example 37 to give a white cast plate having a thickness of 3 mm. This cast plate has practically no gloss and the color tone is not wholly uniform.

EXAMPLE 47

An sulfonate of the formula (I) wherein the alkali metal is sodium, X is ethylene oxide, n is 10 in number average, $R^2$ is a hydrogen atom, and $r^1$ is nonylphenyl (12 parts) and 2,2'-azobisisobutyronitrile (0.003 part) are dissolved in methyl methacrylate (288 parts), and the mixture is polymerized at 80° C. for 2 hours to give a syrup having a viscosity of 5 poises.

In the syrup is dissolved additional 2,2'-azobisisobutyronitrile (0.3 part), and the mixture is polymerized under the same conditions as in Example 37 to give a methacrylic resin cast plate having beautiful gloss transparency and a thickness of 3 mm.

This cast plate had a surface resistivity of $6.5 \times 10^8 \Omega$, a half-life of less than 1 second, a total light transmission of 92%, and a haze of 1%, and the antistatic properties and the optical properties of the product were not deteriorated even by washing with water or with time.

EXAMPLE 48

An sulfonate of the formula (I) wherein the alkali metal is sodium, X is ethylene oxide, n is 4 in number average, $R^2$ is a hydrogen atom, and $R^1$ is butyl (12 parts) and 2,2'-azobisisobutyronitrile (0.003 part) are dissolved in methyl methacrylate (288 parts), and the mixture is polymerized at 80° C. for 2 hours to give a syrup having a viscosity of 5 poises.

In the syrup is dissolved additional 2,2'-azobisisobutyronitrile (0.3 part), and the mixture is polymerized under the same conditions as in Example 37 to give a methacrylic resin cast plate having beautiful gloss transparency and a thickness of 3 mm.

This cast plate had a surface resistivity of $6.5 \times 10^9 \Omega$, a half-life of less than 1 second, a total light transmission of 92%, and a haze of 0.5%, and the antistatic properties and the optical properties of the product were not deteriorated even by washing with water or with time.

REFERENCE EXAMPLE 16

In the same manner as described in Example 47 except that a sulfonate of the formula (I) wherein n is 40 in number average is used, there is obtained a cast plate having a thickness of 3 mm.

This cast plate had a surface resistivity of $4.5 \times 10^8 \Omega$, and a half-life of less than 1 second, a total light transmission of 92%, and a haze of 72%. Thus, it had very bad transparency.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for the production of an antistatic acrylic resin composition, which comprises polymerizing 100 parts by weight of an acrylic monomer selected from methyl metahcrylate monomer or a monomer mixture comprising 50% by weight or more of methyl methacrylate and a copolymerizable vinyl monomer with 0.5 to 15 parts by weight of a sulfonate (A) selected from the group consisting of:

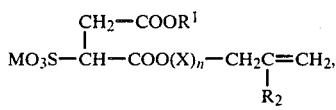

and

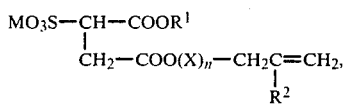

and a mixture thereof wherein $R^1$ is a hydrocarbon group having 1 to 18 carbon atoms, a substituted hydrocarbon group having 1 to 18 carbon atoms in the hydrocarbon moiety, or an alkylene oxide-containing group wherein each alkylene oxide has 2 to 4 carbon atoms; $R^2$ is a hydrogen atom or a methyl group; X is an alkylene oxide having 2 to 4 carbon atoms; n is an integer of 0 to 35 in number average; M is an alkali metal, ammonium, an organic amine base, or an organic quarternary ammonium base, in the presence of 0 to 15 parts by weight of an alkylene oxide (B) of the formula:

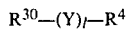

wherein $R^3$ is a hydrogen atom, a hydrocarbon group having 1 to 18 carbon atoms, an acryloyl group, or a methacryloyl group; $R^4$ is a hydrogen atom, an alkyl group having 1 to 18 carbon atoms, an allyl group, an aryl group having 6 to 18 carbon atoms, or an aralkyl group having 7 to 18 carbon atoms; Y is an alkylene oxide having 2 to 4 carbon atoms; and l is 1 to 35 in number average, and 0 to 5 parts by weight of an acidic phosphate (C) of the formula:

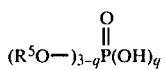

wherein $R^5$ is an alkyl group having 1 to 18 carbon atoms, an allyl group, an aryl group having 6 to 18 carbon atoms, an aralkyl group having 7 to 18 carbon atoms, an acryloxyalkyl group having 1 to 18 carbon atoms in the alkyl moiety, a methacryloxyalkyl group having 1 to 18 carbon atoms in the alkyl moiety, or a derivative thereof; and q is 1 or 2.

2. The method according to claim 1, wherein the sulfonate (A) is a compound of the formula (I) or (II) wherein $R^1$ is a group of the formula: $-(X)_m-R$ wherein R is a hydrocarbon group having 1 to 18 carbon atoms, X is an alkylene oxide having 2 to 4 carbon atoms, and m is 0 to 35 in number average.

3. The method according to claim 1, wherein the sulfonate (A) is a compound of the formula (I) or (II) wherein X is ethylene oxide, and M is an alkali metal.

4. The method according to claim 1, wherein the sulfonate (A) is a compound of the formula (I) or (II) wherein n is 3 to 23 in number average.

5. The method according to claim 4, wherein the sulfonate (A) is a compound of the formula (I) or (II) wherein n is 0.

6. The method according to claim 1, wherein the sulfonate (A) is incorporated in an amount of 1 to 10 parts by weight per 100 parts by weight of the acrylic monomer.

7. The method according to claim 1, wherein the alkylene oxide (B) is a compound of the formula (III) wherein l is 1 to 23 in number average.

8. The method according to claim 1, wherein the alkylene oxide (B) is incorporated in an amount of 0.3 to 15 parts by weight based on the whole weight of the composition.

9. The method according to claim 8, wherein the the alkylene oxide (B) is incorporated in an amount of 0.5 to 10 parts by weight based on the whole weight of the composition.

10. The method according to claim 1, wherein the alkylene oxide (B) is incorporated in an amount of 0.3 to 5 parts by weight per 1 part by weight of the sulfonate (A).

11. The method according to claim 1, wherein the acidic phosphate (C) is incorporated in an amount of 0.5 to 5 parts by weight based on the whole weight of the composition.

12. The method according to claim 1, wherein the polymerization is carried out by a glass cell casting or a continuous casting.

13. The method according to claim 1, wherein said monomer mixture comprises 70% by weight or more of methyl methacrylate and a copolymerizable vinyl monomer.

* * * * *